United States Patent
Yen (10) Patent No.: US 7,385,402 B2
(45) Date of Patent: Jun. 10, 2008

(54) LIGHT SOURCE CURRENT SENSING CIRCUIT AND DRIVING CIRCUIT IN A DISPLAY DEVICE

(75) Inventor: Cheng-Chi Yen, Tainan County (TW)

(73) Assignee: Himax Display, Inc., Tainan County (TW)

( * ) Notice: Subject to any disclaimer, the term of this patent is extended or adjusted under 35 U.S.C. 154(b) by 0 days.

(21) Appl. No.: 11/539,298

(22) Filed: Oct. 6, 2006

(65) Prior Publication Data
US 2008/0084222 A1    Apr. 10, 2008

(51) Int. Cl.
*G01R 31/08* (2006.01)
(52) U.S. Cl. ............... 324/522; 324/609; 324/126
(58) Field of Classification Search .......... 324/522, 324/126, 609, 691, 769; 327/387
See application file for complete search history.

(56) References Cited

U.S. PATENT DOCUMENTS

2002/0158654 A1*   10/2002   Graf ................... 324/765
2005/0243041 A1    11/2005   Vinn

\* cited by examiner

*Primary Examiner*—Vincent Q Nguyen
(74) *Attorney, Agent, or Firm*—J.C. Patents (57) ABSTRACT

A current sensing circuit for sensing a current flowing through a LED bank and a driver circuit for driving the LED bank are provided. The current sensing circuit includes: a matched transistor group, having a first current path coupled to the load device for sensing the load current and a second current path for generating a first current according to the load current; an operation amplifier, coupled to the first and second current paths; and a current source, having a third current path coupled to the second current path and a fourth current path for generating a second current according to the first current, the second current indicating conductive condition of the load device.

27 Claims, 4 Drawing Sheets

LIGHT SOURCE CURRENT SENSING CIRCUIT AND DRIVING CIRCUIT IN A DISPLAY DEVICE

BACKGROUND OF THE INVENTION

1. Field of Invention

The present invention relates to a light source current sensing circuit and driving circuit in a display device. More particularly, the present invention relates to a light source current sensing circuit and driving circuit in a display device, for improving efficiency.

2. Description of Related Art

Light emitting diodes ("LEDs") are known act as a source of emitted light for a wide variety of applications. LEDs are known to provide many advantages over incandescent and fluorescent illumination because of their long operating life, high efficiency, light weight, and low profile. LED light output is proportional to current therethrough. Problems can be particularly egregious for portable devices where battery output gradually decreases with time of use. Therefore, an LED driver circuit is needed that is relatively immune to small voltage fluctuations.

Moreover, LEDs are particularly convenient for applications such as backlighting liquid crystal display ("LCD") screens. The LEDs are often configured as a set of serial connected LEDs, sometimes referred to in the art and hereinafter as "LED chains," "LED sets," "LED banks," or the like. Lightweight, battery-powered devices, such as mobile computing and communications devices—e.g., personal digital assistant, cellular telephone, electronic book, and the like—may use LEDs as a back light or side light. It is important to sense the current provided to LEDs to provide adequate lighting and to minimize flickering on the screen.

Figure 1:
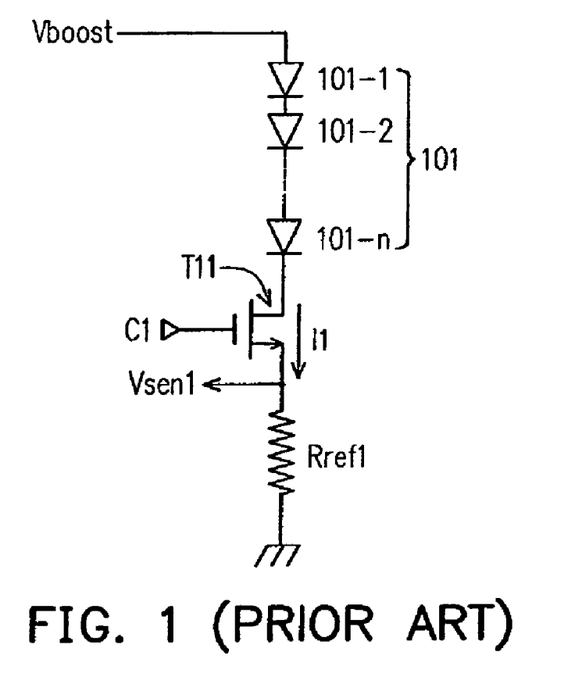
FIG. 1 shows a conventional circuit diagram for sensing current provided to LEDs.

FIG. 1 shows a conventional circuit diagram for sensing current provided to LEDs. As shown in FIG. 1, the current sensing circuit includes a transistor T11 and a reference resistor Rref1. For sensing a current I1 through an LED bank 101 including LEDs 101-1~101-n, a voltage drop Vsen1 across the reference resistor Rref1 is detected. The detected voltage Vsen1 is fed to a control loop (not shown) for comparing with a reference voltage and the comparison result is used for adjusting/determining the voltage Vboost provided to the LED bank 101. Further, in order to cut off the current I1 to the resistor Rref1, the transistor T11 is provided. The transistor T11 is turned on or off according to a control signal C1. For example, when the transistor T11 is an NMOS transistor, it is turned ON if the control signal C1 is logic HIGH and OFF if logic LOW.

In order to reduce power consumption by the resistor Rref1, the resistance value of the resistor Rref1 is preferred to be small. However, as known, it is not easy to precisely control the resistance of a small resistor. Besides, the addition of the transistor T11 also reduces the efficiency of the control loop.

Therefore, a current sensing circuit for sensing a current flowing through the LED bank(s) and a driving circuit for driving the LED bank(s) are needed, which may increase the efficiency and eliminate the disadvantages occurred in controlling small reference resistors.

SUMMARY OF THE INVENTION

One of the aspects of the invention is to provide a current sensing circuit and a driving circuit, which control/adjust respectively brightness of each of the LED banks by controlling the respective reference load(s) corresponding to the LED banks.

To at least achieve the above and other aspects, the invention provides a current sensing circuit for sensing a load current flowing through a load device. The current sensing circuit comprises: a matched transistor group, having a first current path coupled to the load device for sensing the load current and a second current path for generating a first current according to the load current; an operation amplifier, coupled to the first and second current paths; and a current source, having a third current path coupled to the second current path and a fourth current path for generating a second current according to the first current, the second current indicating conductive condition of the load device.

Further, the present invention provides a current sensing circuit for sensing at least first and second load currents flowing through at least first and second load devices respectively. The current sensing circuit comprises: a matched transistor group, having first and second current paths coupled to the first and second load devices respectively, for sensing the first and second load currents and a third current path for generating a first current according to at least one of the first and second load currents; an operation amplifier, selectively coupled to the first and second current paths; and a current source, having a fourth current path coupled to the third current path and a fifth current path for generating a second current according to the first current, the second current representing operation status of the first and second load devices.

Still further, the present invention provides a driving circuit for driving at least first and second load devices, comprising a current sensing circuit and a control loop. The current sensing circuit includes: a matched transistor group, having a first current path for sensing at least a first load current through the first load device and a second current path for generating a first current based on the first load current; an operation amplifier, coupled to the first and second current paths; and a current source, having a third current path coupled to the second current path and a fourth current path for generating a second current based on the first current, the second current referring to status information of at least one of the first and second load devices. The control loop drives the first and second load devices and adjusts at least one of the first load current and a second load current through the second load device according to the second current.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 2:
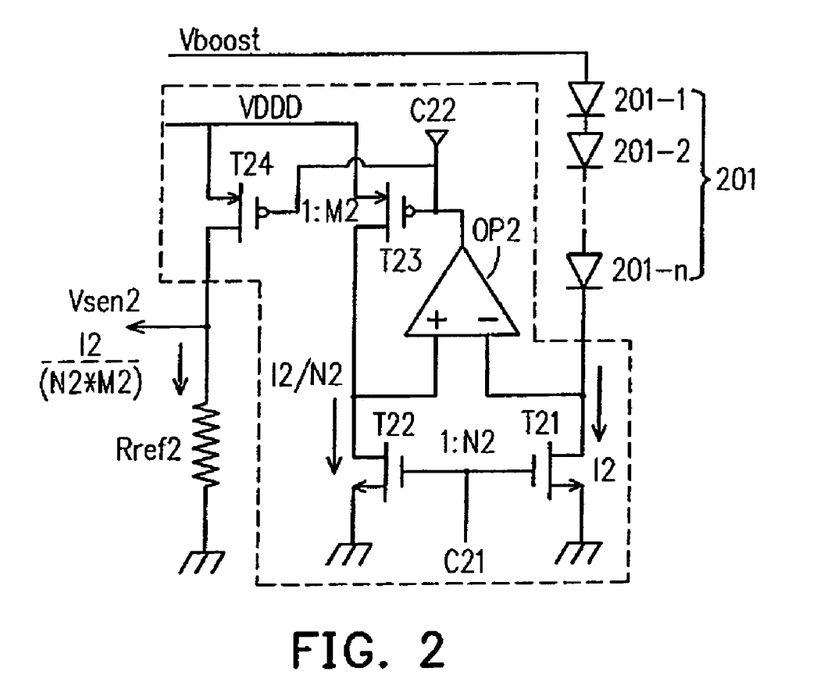
FIG. 2 shows a current sensing circuit for sensing a LED current flowing through a LED bank according to a first embodiment of the invention.

Please refer to FIG. 2, which shows a current sensing circuit for sensing a LED current I2 flowing through a LED bank 201, according to a first embodiment of the invention. The LED bank 201 includes a plurality of LEDs 201-1~201-n. The current sensing circuit includes a matched transistor group, an operation amplifier OP2, a current source and a reference load Rref2.

The matched transistor group includes transistors T21 and T22. The matched transistor group has a first current path for sensing the LED current I2 and a second current path for generating another current I2/N2 according to the LED current I2, N2 (a natural number) referring to the size (W/L) ratio between the transistors T22 and T21 (T22:T21=1:N2).

The transistor T21 of the matched transistor group has a drain terminal providing the first current path, a gate terminal for receiving a control signal C21 and a source terminal coupled to a ground terminal. The drain terminal of the transistor T21 is coupled to the LED bank 201 and the inverting input terminal of the operation amplifier OP2.

The transistor T22 of the matched transistor group has a drain terminal providing the second current path, a gate terminal coupled to the control terminal of the first transistor for receiving the control signal C21 and a source terminal coupled to the ground terminal. The drain terminal of the transistor T22 is coupled to the non-inverting input terminal of the operation amplifier OP2.

The transistors T21 and T22 are matched to each other. The definition of the term "matched" in this embodiment is ordinary in the field. The control signal C21 controls ON/OFF states of the matched transistor group. For example, under the case of the transistors T21 and T22 both being NMOS transistors, the transistors T21 and T22 are both turned ON when the control signal C21 is logic HIGH and OFF when the control signal C21 is logic LOW.

The operation amplifier OP2 is coupled to the first and second current paths of the matched transistor group. More specifically, the inverting input terminal of the operation amplifier OP2 is coupled to the first current path of the matched transistor group (or the drain terminal of the transistor T21) and to the LED bank 201. The non-inverting input terminal of the operation amplifier OP2 is coupled to the second current path of the matched transistor group (or the drain terminal of the transistor T22). The output terminal of the operation amplifier OP2 is coupled to the current source.

By the virtual ground between the inverting input terminal and the non-inverting input terminal of the operation amplifier OP2, the drain voltages of the transistors T21 and T22 may be substantially the same. Therefore, the transistors T21 and T22 may have the same $V_{DS}$ (drain-to-source voltage). Besides, because the gate terminals of the transistors T21 and T22 are coupled to each other, the transistors T21 and T22 may have the same $V_{GS}$ (gate-to-source voltage). So, even if the transistors T21 and T22 are operated in the saturation mode or in the triode mode, due to the same $V_{DS}$ and $V_{GS}$, the currents flowing through the transistors T21 and T22 may be I2 and I2/N2, respectively.

The current source has a third current path coupled to the second current path and a fourth current path for generating a current I2/(N2*M2) according to the current I2/N2, M2 being a natural number. The current I2/(N2*M2) may indicate conductive condition of the LED bank 201. The conductive condition refers to, for example, the brightness of the LED bank 201.

More specifically, the current source includes transistors T23 and T24. The transistor T23 has a source terminal coupled to a power source VDDD, a gate terminal coupled to the output terminal of the operation amplifier OP2, and a drain terminal providing the third current path. The drain terminal of the transistor T23 is further coupled to the drain terminal of the transistor T22. The gate terminal of the transistor T23 also receives a control signal C22. Because the transistors T22 and T23 are serially connected, the current flowing through the transistor T23 may have a value of I2/N2.

The transistor T24 has a source terminal coupled to the power source (VDDD), a gate terminal coupled to the output terminal of the operation amplifier OP2 and a drain terminal providing the fourth current path. The drain terminal of the transistor T24 is further coupled to the reference resistor Rref2. The gate terminal of the transistor T24 also receives the control signal C22. The current source is selectively turned off according to the control signal C22. Alternatively, the current source is selectively turned off by power off of the operation amplifier OP2. The transistors T23 and T24 are matched to each other and their size ratio is M2:1 (T23:T24=M2:1). So, the current through the transistor T24 is I2/(N2*M2).

As shown in FIG. 2, the voltage drop across the resistor Rref2 is shown as Vsen2=Rref2*I2/(N2*M2). The voltage drop Vsen2 is fed to a control loop (not shown) for comparing with a reference voltage and the comparison result is used for adjusting/determining the voltage Vboost provided to the LED bank 201. By the current sensing circuit of the first embodiment, the current through the LED bank 201 is sensed and transformed into the voltage Vsen2.

Compared to the prior art, the resistor Rref2 has a large resistance value (because the current through the resistor Rref2 is small), which means it is easier to precisely control the resistance value of the resistor Rref2. Besides, because the transistor T21 has a small ON resistance and a low $V_{DS}$, the efficiency of the control loop (not shown) is high.

Second Embodiment

The second embodiment of the invention may be applied in a LED current sensing circuit or a LED driver circuit for color sequential mode. For color sequential mode, three LED banks of red light (R), green light (G) and blue light (B) are used for providing light source. In the second embodiment, one LED current sensing circuit is enough for precisely controlling currents flowing through the R, G and B LED banks.

Figure 3:
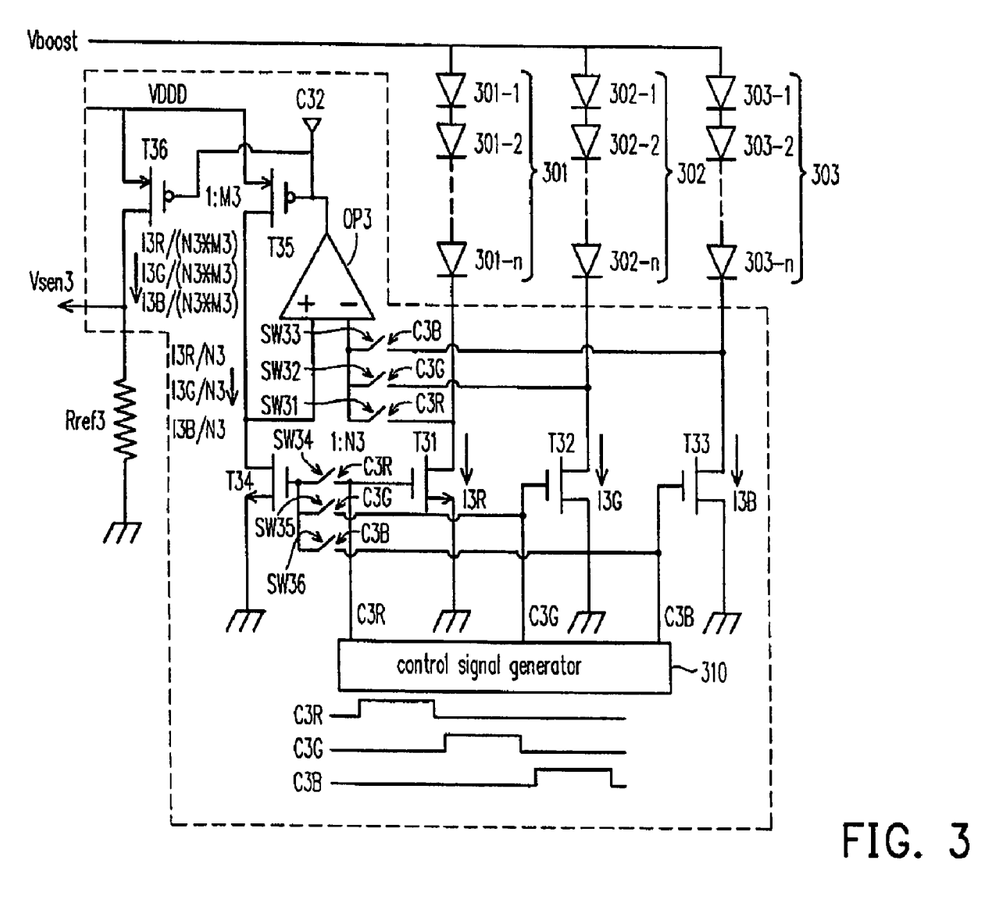
FIG. 3 shows a current sensing circuit for sensing LED currents flowing through LED banks according to a second embodiment of the invention.

FIG. 3 shows a current sensing circuit according to the second embodiment. The current sensing circuit may be used for sensing LED currents I3R, I3G and I3B flowing through the R LED bank 301, the G LED bank 302 and the B LED bank 303, respectively. The R LED bank 301 includes several R LEDs 301-1~301-n. The G LED bank 302 includes several G LEDs 302-1~302-n. The B LED bank 303 includes several B LEDs 303-1~303-n.

The current sensing circuit comprises: a matched transistor group, an operation amplifier OP3, a current source and a reference resistor Rref3. The matched transistor group has first, second and third current paths coupled to the LED banks 301~303, respectively, for sensing the LED currents I3R, I3G and I3B, and further a fourth current path for generating a current according to at least one of the LED currents I3R, I3G and I3B.

The matched transistor group includes transistors T31, T32, T33 and T34. The transistor T31 of the matched transistor group has a drain terminal providing the first current path, a gate terminal for receiving a control signal C3R and a source terminal coupled to a ground terminal. The drain terminal of the transistor T31 is coupled to the R LED bank 301. The drain terminal of the transistor T31 is further selectively coupled to an inverting input terminal of the operation amplifier OP3 via a switch SW31. The switch SW31 is under control of the control signal C3R.

The transistor T32 of the matched transistor group has a drain terminal providing the second current path, a gate terminal for receiving a control signal C3G and a source terminal coupled to the ground terminal. The drain terminal of the transistor T32 is coupled to the G LED bank 302. The drain terminal of the transistor T32 is further selectively coupled to the inverting input terminal of the operation amplifier OP3 via a switch SW32. The switch SW32 is under control of the control signal C3G.

The transistor T33 of the matched transistor group has a drain terminal providing the third current path, a gate terminal for receiving a control signal C3B and a source terminal coupled to the ground terminal. The drain terminal of the transistor T33 is coupled to the B LED bank 303. The drain terminal of the transistor T33 is further selectively coupled to the inverting input terminal of the operation amplifier OP3 via a switch SW33. The switch SW33 is under control of the control signal C3B. The control signals C3R, C3G and C3B are generated by a control signal generator 310. The control signals C3R, C3G and C3B are non-overlapping.

The transistor T34 of the matched transistor group has a drain terminal providing the fourth current path, a gate terminal and a source terminal coupled to the ground terminal. The drain terminal of the transistor T34 is coupled to the non-inverting input terminal of the operation amplifier OP3. The gate terminal of the transistor T34 is selectively coupled to the gate terminals of the transistors T31~T33 via switches SW34, SW35 and SW36 under control of the signals C3R, C3G and C3B. The transistors T31~T34 are matched to each other. The definition of the term "matched" in this embodiment is ordinary in the field.

The operation amplifier OP3 is selectively coupled to the first, second and third current paths of the matched transistor group. More specifically, the inverting input terminal of the operation amplifier OP3 is selectively coupled to the first, second and third current paths of the matched transistor group under control of the control signals C3R, C3G and C3B. The non-inverting input terminal of the operation amplifier OP3 is coupled to the fourth current path of the matched transistor group (or the drain terminal of the transistor T34). The output terminal of the operation amplifier OP3 is coupled to the current source.

By the virtual ground between the inverting input terminal and the non-inverting input terminal of the operation amplifier OP2, the drain voltages of the transistors T31/T32/T33 and T34 may be substantially the same. Therefore, the transistors T31/T32/T33 and T34 may have the same $V_{DS}$. Besides, because the gate terminals of the transistors T31/T32/T33 and T34 may be coupled together, the transistors T31/T32/T33 and T34 may have the same $V_{GS}$. So, even if the transistors T31/T32/T33 and T34 are operated in the saturation mode or in the triode mode, due to the same $V_{DS}$ and $V_{GS}$, the currents flowing through the transistors T31/T32/T33 and T34 may have a ratio based on their size ratios. For example, if the size ratio between the transistors T31/T32/T33 and T34 is N3:1 (N3 being a natural number), the current through the transistor T34 may be one of I3R/N3, I3G/N3 and I3B/N3, depending on which transistor is coupled to the inverting input terminal of the operation amplifier OP3 and to the transistor T34. For alternative example, the size ratios between the transistors T31/T32/T33 and T34 may be different.

The current source circuit has a fifth current path coupled to the fourth current path and a sixth current path for generating a current I3R/(N3*M3) (or I3G/(N3*M3) or I3B/(N3*M3)) according to the current through the transistor T34, M3 being a natural number. The current generated by the sixth current path may indicate conductive condition of the LED banks 301~303. The conductive condition refers to, for example, the brightness of the LED banks 301~303.

More specifically, the current source includes transistors T35 and T36. The transistor T35 has a source terminal coupled to a power source VDDD, a gate terminal coupled to the output terminal of the operation amplifier OP3, and a drain terminal providing the fifth current path. The drain terminal of the transistor T35 is further coupled to the drain terminal of the transistor T34. The gate terminal of the transistor T35 also receives a control signal C32. Because the transistors T34 and T35 are serially connected, the current flowing through the transistor T35 is also the current I3R/N3, or I3G/N3 or I3B/N3.

The transistor T36 has a source terminal coupled to the power source (VDDD), a gate terminal coupled to the output terminal of the operation amplifier OP3 and a drain terminal providing the sixth current path. The drain terminal of the transistor T36 is further coupled to the reference resistor Rref3. The gate terminal of the transistor T36 also receives the control signal C32. The current source is selectively turned off according to the control signal C32. Alternatively, the current source is selectively turned off by power off of the operation amplifier OP3. The transistors T35 and T36 are matched to each other and their size ratio is M3:1 (T35: T36=M3:1). So, the current through the transistor T36 is I3R/(N3*M3), I3G/(N3*M3) or I3B/(N3*M3).

As shown in FIG. 3, the voltage drop across the resistor Rref3 is shown as Vsen3=Rref3*I3R/(N3*M3), Vsen3=Rref3*I3G/(N3*M3) or Vsen3=Rref3*I3B/(N3*M3). The voltage drop Vsen3 is fed to a control loop (not shown) for comparing with a reference voltage and the comparison result is used for adjusting/determining the voltage Vboost provided to the LED banks 301~303. By the current sensing circuit of this embodiment, the current through the LED banks 301~303 is sensed and transformed into the voltage Vsen3.

Compared to the prior art, the resistor Rref3 has a large resistance value (because the current through the resistor Rref3 is small), which means it is easier to precisely control the resistance value of the resistor Rref3. Besides, because the transistor T31/T32/T33 has a small ON resistance and a low $V_{DS}$, the efficiency of the control loop (not shown) is high.

Third Embodiment

Figure 4:
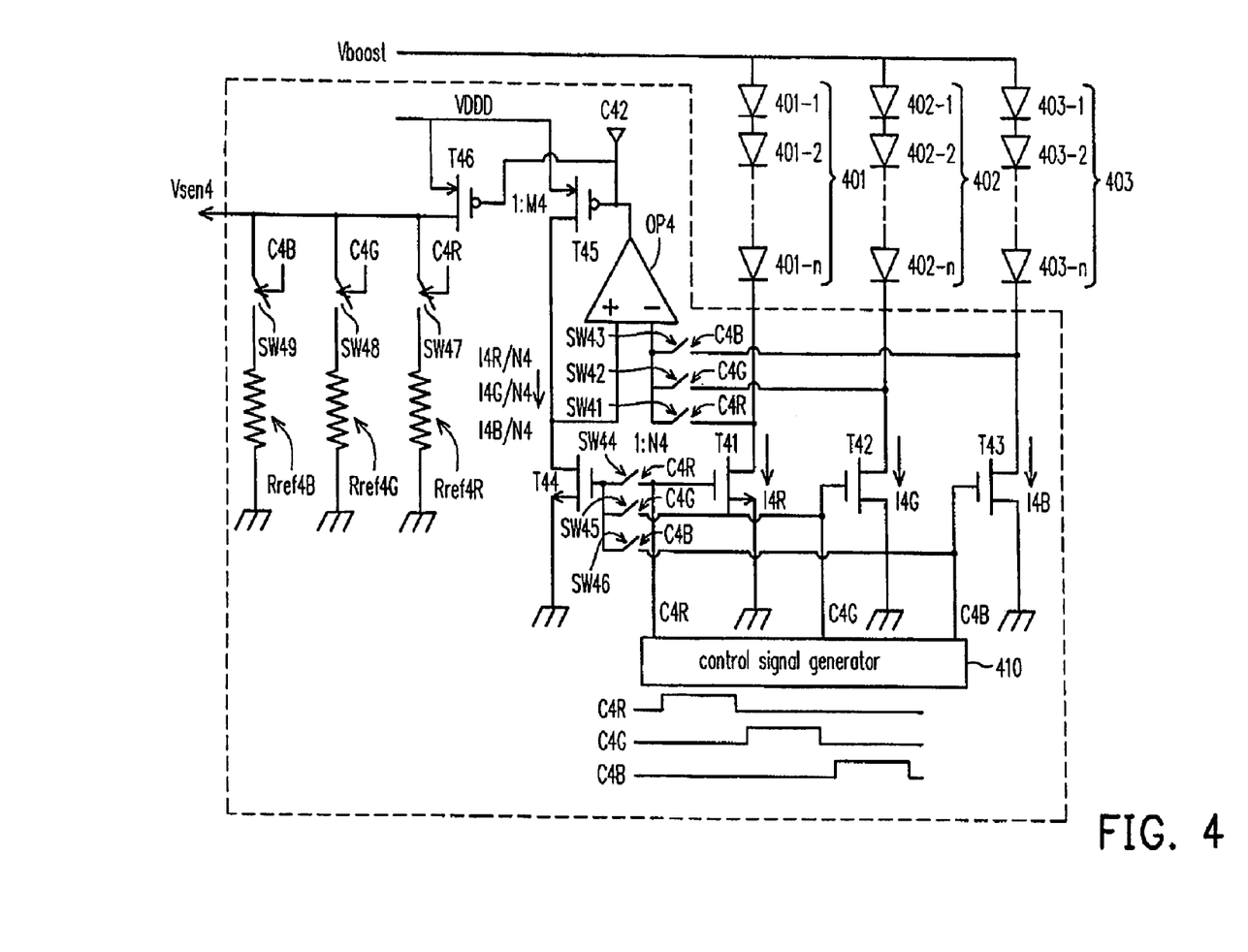
FIG. 4 shows a third embodiment, which is used for controlling respective brightness of the LED banks.

A third embodiment may be used to control/adjust respective brightness of the R/G/B LED banks. The third embodiment is shown in FIG. 4. The third embodiment shown in FIG. 4 has a similar structure to the second embodiment shown in FIG. 3.

In order to control/adjust respective brightness of the R/G/B LED banks, the currents through the R/G/B LED banks are respectively sensed. For this purpose, the drain terminal of the transistor T46 of the current source is selectively coupled to reference resistors Rref4R, Rref4G and Rref4B via switches SW47, SW48 and SW49 under control of the control signals C4R, C4G and C4B.

For example, for sensing the current I4R through the R LED bank 401, the switches SW41, SW44 and SW47 are turned on under control of the control signal C4R, while the other switches are turned off. So that, the current I4R may be sensed and transformed into the voltage Vsen4, which is shown as Vsen4=Rref4*I4R/(N4*M4). The voltage drop Vsen4 is fed to a control loop (not shown) for comparing with a reference voltage and the comparison result is used for adjusting/determining the voltage Vboost provided to the R LED bank 401. Therefore, by changing the resistance value(s) of the resistor(s), the brightness of the corresponding LED bank(s) is changed.

Fourth Embodiment

Figure 5:
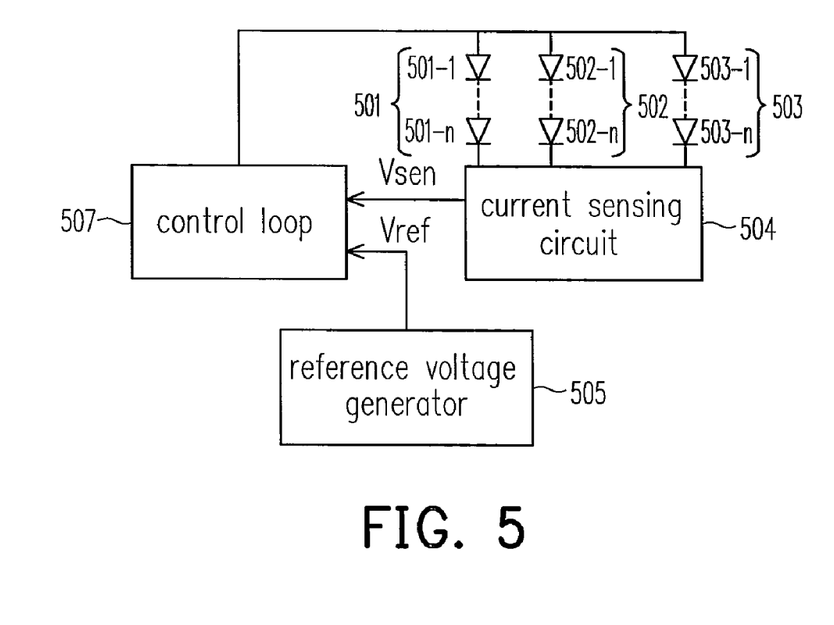
FIG. 5 shows a block diagram of a LED drive circuit for driving LED banks according to a fourth embodiment of the invention.

Now, please refer to FIG. 5 for showing a block diagram of a LED drive circuit for driving LED banks 501~503 according to the fourth embodiment of the invention. Each of the LED banks 501~503 includes a plurality of LEDs 501-1~501-n/502-1~502-n/503-1~503-n. The LED drive circuit includes a current sensing circuit 504, a reference voltage generator 505 and a control loop 507.

The current sensing circuit 504 may have a circuit configuration similar to those shown in FIG. 2~FIG. 4. The reference voltage generator 505 generates a reference voltage Vref. The control loop 507 compares the reference voltage Vref with the sensed voltage Vsen from the current sensing circuit 504. The control loop 507 controls/adjusts the voltage supplied to the LED banks 501~503 for controlling/adjusting the brightness emitted from the LED banks 501~503. The configuration of the reference voltage generator 505 and the control loop 507 may be not specified here.

Further, in the above-mentioned embodiments, another possible way for controlling respective brightness of the R/G/B LED banks relies on controlling the duty cycles of the control signals C3R/C3G/C3B or C4R/C4G/C4B. That is, the longer the duty cycles of the control signal (for example the control signal C3R), the brighter light beams emitted from the corresponding LED bank (for example, the red light LED bank).

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A current sensing circuit for sensing a load current flowing through a load device, the current sensing circuit comprising:
   a matched transistor group, having a first current path coupled to the load device for sensing the load current and a second current path for generating a first current according to the load current;
   an operation amplifier, coupled to the first and second current paths; and a current source, having a third current path coupled to the second current path and a fourth current path for generating a second current according to the first current, the second current indicating conductive condition of the load device; wherein the operation amplifier includes: a first input terminal coupled to the first current path; a second input terminal coupled to the second current path, and an output terminal coupled to the current source.

2. The current sensing circuit of claim 1, further comprising a reference load coupled to the fourth current path.

3. The current sensing circuit of claim 1, wherein the matched transistor group includes:
   a first transistor, having a first terminal providing the first current path, a control terminal for receiving a first control signal and a second terminal coupled to a ground terminal, the first terminal of the first transistor coupled to the load device and the operation amplifier; and
   a second transistor, having a first terminal providing the second current path, a control terminal coupled to the control terminal of the first transistor and a second terminal coupled to the ground terminal, the first terminal of the second transistor coupled to the operation amplifier;
   wherein the first and second transistors are matched to each other and the first control signal controls ON/OFF states of the matched transistor group.

4. The current sensing circuit of claim 1, wherein the current source includes:
   a third transistor, having a first terminal coupled to a power source, a control terminal coupled to the operation amplifier and a second terminal providing the third current path; and
   a fourth transistor, having a first terminal coupled to the power source, a control terminal coupled to the operation amplifier and a second terminal providing the fourth current path;
   wherein the current source is selectively turned off by power off of the operation amplifier and the third and fourth transistors are matched to each other.

5. The current sensing circuit of claim 4, wherein the control terminals of the third and fourth transistors are coupled to a second control signal and the current source is selectively turned off according to the second control signal.

6. A current sensing circuit for sensing at least first and second load currents flowing through at least first and second load devices respectively, the current sensing circuit comprising:
   a matched transistor group, having first and second current paths coupled to the first and second load devices respectively, for sensing the first and second load currents and a third current path for generating a first current according to at least one of the first and second load currents;
   an operation amplifier, selectively coupled to the first and second current paths and coupled to the third current path; and a current source, having a fourth current path coupled to the third current path and a fifth current path for generating a second current according to the first current, the second current representing operation status of the first and second load devices.

7. The current sensing circuit of claim 6, further comprising a first reference load coupled to the fifth current path.

8. The current sensing circuit of claim 6, wherein the matched transistor group includes:
a first transistor, having a first terminal providing the first current path, a control terminal for receiving a first control signal and a second terminal coupled to a ground terminal, the first terminal of the first transistor selectively coupled to the operation amplifier;
a second transistor, having a first terminal providing the second current path, a control terminal for receiving a second control signal and a second terminal coupled to the ground terminal, the first terminal of the second transistor selectively coupled to the operation amplifier; and
a third transistor, having a first terminal providing the third current path, a control terminal selectively coupled to the first and second control signals, and a second terminal coupled to the ground terminal;
wherein the first and second control signals are non-overlapping and control ON/OFF states of the matched transistor group; and the first, second and third transistors are matched to each other.

9. The current sensing circuit of claim 6, further comprising:
a first switch, selectively controlling the coupling between the first current path and the operation amplifier; and
a second switch, selectively controlling the coupling between the second current path and the operation amplifier.

10. The current sensing circuit of claim 6, wherein the operation amplifier includes:
a first input terminal selectively coupled to the first and second current paths;
a second input terminal coupled to the third current path, and
an output terminal coupled to the current source.

11. The current sensing circuit of claim 6, wherein the current source includes:
a fourth transistor, having a first terminal coupled to a power source, a control terminal coupled to the operation amplifier and a second terminal providing the fourth current path; and
a fifth transistor, having a first terminal coupled to the power source, a control terminal coupled to the operation amplifier and a second terminal providing the fifth current path;
wherein the current source is selectively turned off by power off of the operation amplifier and the fourth and fifth transistors are matched to each other.

12. The current sensing circuit of claim 11, wherein the control terminals of the fourth and fifth transistors are coupled to a third control signal, and the current source is selectively turned off according to the third control signal.

13. The current sensing circuit of claim 6, further comprising:
a first reference load, selectively coupled to the fifth current path; and
a second reference load, selectively coupled to the fifth current path.

14. The current sensing circuit of claim 13, further comprising:
a third switch, selectively controlling a coupling between the fifth current path and the first reference load; and
a fourth switch, selectively controlling a coupling between the fifth current path and the second reference load.

15. A driving circuit for driving at least first and second load devices, comprising:
a current sensing circuit, including:
a matched transistor group, having a first current path for sensing at least a first load current through the first load device and a second current path for generating a first current based on the first load current;
an operation amplifier, coupled to the first and second current paths; and
a current source, having a third current path coupled to the second current path and a fourth current path for generating a second current based on the first current, the second current referring to status information of at least one of the first and second load devices; and
a control loop, driving the first and second load devices and adjusting at least one of the first load current and a second load current through the second load device according to the second current.

16. The driving circuit of claim 15, further comprising a reference load coupled to the fourth current path.

17. The driving circuit of claim 16, wherein the matched transistor group includes:
a first transistor, having a first terminal providing the first current path, a control terminal for receiving a first control signal and a second terminal coupled to a ground terminal, the first terminal of the first transistor coupled to the first load device and the operation amplifier; and
a second transistor, having a first terminal providing the second current path, a control terminal coupled to the control terminal of the first transistor, and a second terminal coupled to the ground terminal, the first terminal of the second transistor coupled to the operation amplifier;
wherein the first and second transistors are matched to each other and the first control signal controls ON/OFF states of the matched transistor group.

18. The driving circuit of claim 16, wherein the operation amplifier includes:
a first input terminal coupled to the first current path;
a second input terminal coupled to the second current path, and
an output terminal coupled to the current source.

19. The driving circuit of claim 16, wherein the current source includes:
a third transistor, having a first terminal coupled to a power source, a control terminal coupled to the operation amplifier and a second terminal providing the third current path; and
a fourth transistor, having a first terminal coupled to the power source, a control terminal coupled to the operation amplifier and a second terminal providing the fourth current path;
wherein the current source is selectively turned off by power off of the operation amplifier and the third and fourth transistors are matched to each other.

20. The driving circuit of claim 19, wherein the control terminals of the third and fourth transistors are further coupled to a second control signal, and the current source is selectively turned off according to the second control signal.

21. The driving circuit of claim 16, wherein the matched transistor group has a fifth current path for sensing at least the second load current, and the matched transistor group includes:
   a fifth transistor, having a first terminal providing the first current path, a control terminal for receiving a third control signal and a second terminal coupled to a ground terminal, the first terminal of the fifth transistor selectively coupled to the operation amplifier;
   a sixth transistor, having a first terminal providing the fifth current path, a control terminal for receiving a fourth control signal and a second terminal coupled to the ground terminal, the first terminal of the sixth transistor selectively coupled to the operation amplifier; and
   a seventh transistor, having a first terminal providing the second current path, a control terminal selectively coupled to the third and fourth control signals, and a second terminal coupled to the ground terminal;
   wherein the third and fourth control signals are non-overlapping and control ON/OFF states of the matched transistor group; and the fifth, sixth and seventh transistors are matched to each other.

22. The driving circuit of claim 21, further comprising:
   a first switch, selectively controlling the coupling between the first current path and the operation amplifier; and
   a second switch, selectively controlling the coupling between the fifth current path and the operation amplifier.

23. The driving circuit of claim 21, wherein the operation amplifier includes:
   a first input terminal selectively coupled to the first, second and fifth current paths;
   a second input terminal coupled to the second current path, and
   an output terminal coupled to the current source.

24. The driving circuit of claim 21, wherein the current source includes:
   a eighth transistor, having a first terminal coupled to a power source, a control terminal coupled to the operation amplifier and a second terminal providing the third current path; and
   a ninth transistor, having a first terminal coupled to the power source, a control terminal coupled to the operation amplifier and a second terminal providing the fourth current path;
   wherein the current source is selectively turned off by power off of the operation amplifier and the eighth and ninth transistors are matched to each other.

25. The driving circuit of claim 24, wherein the control terminals of the eighth and ninth transistors are further coupled to a fifth control signal, and the current source is selectively turned off according to the fifth control signal.

26. The driving circuit of claim 15, further comprising:
   a second reference load, selectively coupled to the fourth current path; and
   a third reference load, selectively coupled to the fourth current path.

27. The driving circuit of claim 26, further comprising:
   a third switch, selectively controlling a coupling between the fourth current path and the second reference load; and
   a fourth switch, selectively controlling a coupling between the fourth current path and the third reference load.

* * * * *